United States Patent [19]
McLaughlin et al.

[11] Patent Number: 4,806,922
[45] Date of Patent: Feb. 21, 1989

[54] DISPLAY DEVICE UTILIZING A PLURALITY OF NCAP LIQUID CRYSTAL MODULES

[75] Inventors: Charles W. McLaughlin, Portola Valley; James L. Fergason, Atherton; Robert Paker, Alamo, all of Calif.

[73] Assignee: Taliq Corporation, Sunnyvale, Calif.

[21] Appl. No.: 212,039

[22] Filed: Jun. 23, 1988

Related U.S. Application Data

[63] Continuation of Ser. No. 102,825, Sep. 23, 1987, abandoned, which is a continuation of Ser. No. 620,376, Jun. 12, 1984, abandoned.

[51] Int. Cl.$^4$ .............................................. G09G 3/36
[52] U.S. Cl. .................................. 340/784; 340/719; 340/765; 350/343; 350/344; 350/334
[58] Field of Search ............... 340/718, 719, 765, 784; 350/334, 343, 344; 368/226, 227, 240, 242; 358/230, 250, 251

[56] References Cited

U.S. PATENT DOCUMENTS

| | | | |
|---|---|---|---|
| 3,578,844 | 5/1971 | Churchill | 350/160 |
| 3,600,061 | 8/1971 | Heilmeier et al. | 350/334 |
| 3,962,700 | 6/1976 | Criscimagna | 340/758 |
| 4,015,422 | 4/1977 | Van Haaften | 340/815.2 |
| 4,156,833 | 5/1979 | Wey et al. | 340/781 |
| 4,410,887 | 10/1983 | Stolov et al. | 350/344 |
| 4,413,257 | 11/1983 | Kraemer et al. | 350/343 |
| 4,435,047 | 3/1984 | Fergasen | 350/334 |
| 4,449,123 | 5/1984 | Muranaga | 340/784 |
| 4,468,659 | 8/1984 | Ohba et al. | 340/781 |
| 4,549,174 | 10/1985 | Funada et al. | 340/815.2 |

*Primary Examiner*—Marshall M. Curtis
*Attorney, Agent, or Firm*—Flehr, Hohbach, Test, Albritton, & Herbert

[57] ABSTRACT

A liquid crystal display comprising a plurality of modules wherein each module includes a nematic curvilinearly aligned phases liquid crystal material. The modules are positioned adjacent to one another to effect a homogeneous display. Each module may include electrode means supported on a substrate. The substrate may include a flexible extension thereof on which conductive paths may be formed. The extension of the substrate is sufficiently flexible to permit the interconnection of the electrode means via the conductive paths to a circuit means for applying an electric field to the electrodes.

24 Claims, 4 Drawing Sheets

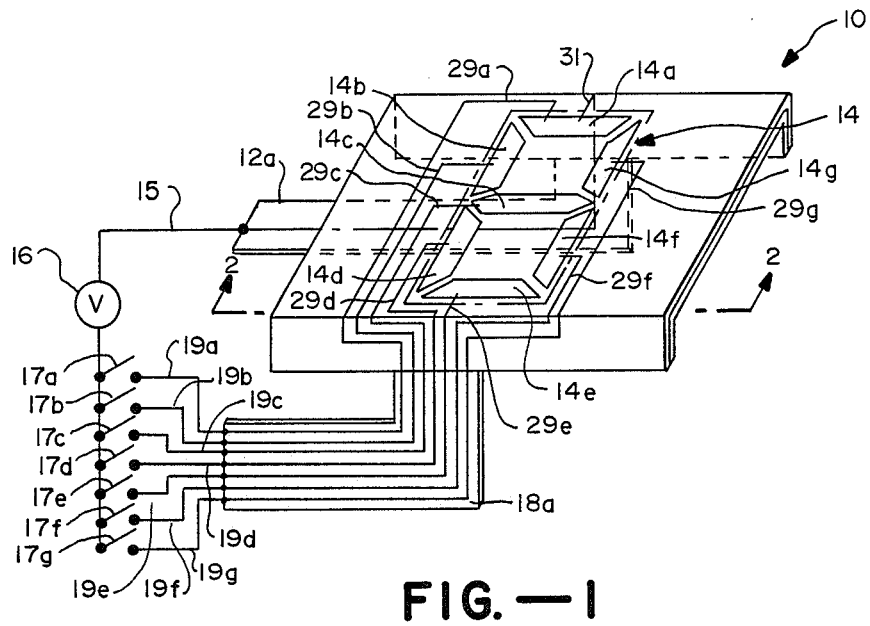
FIG.—1
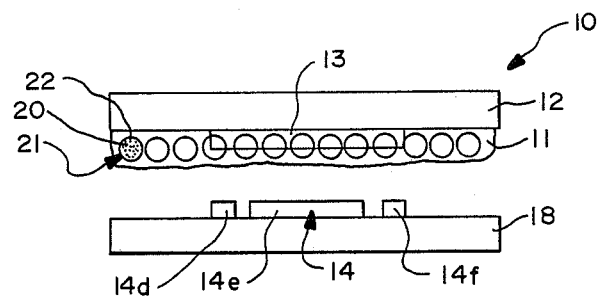
FIG.—2
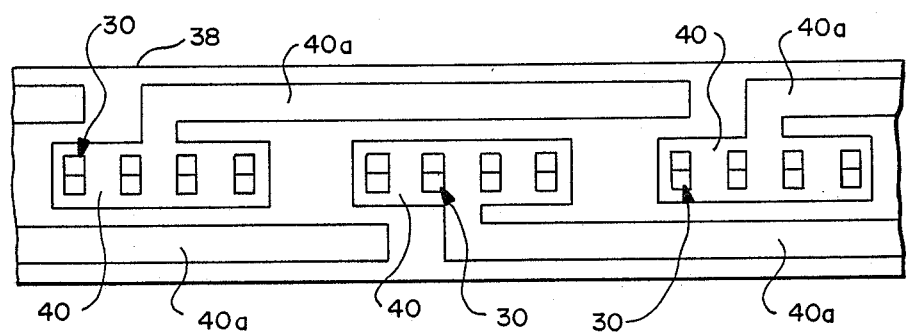
FIG.—3

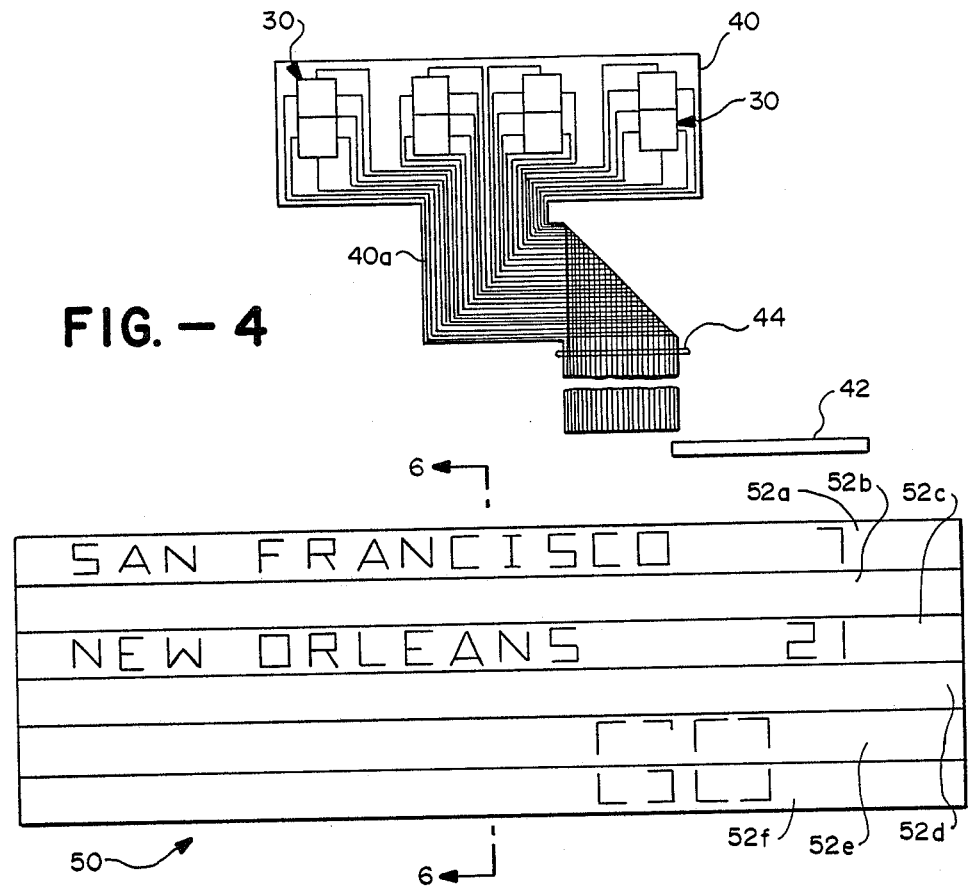
FIG. — 4
FIG. — 5
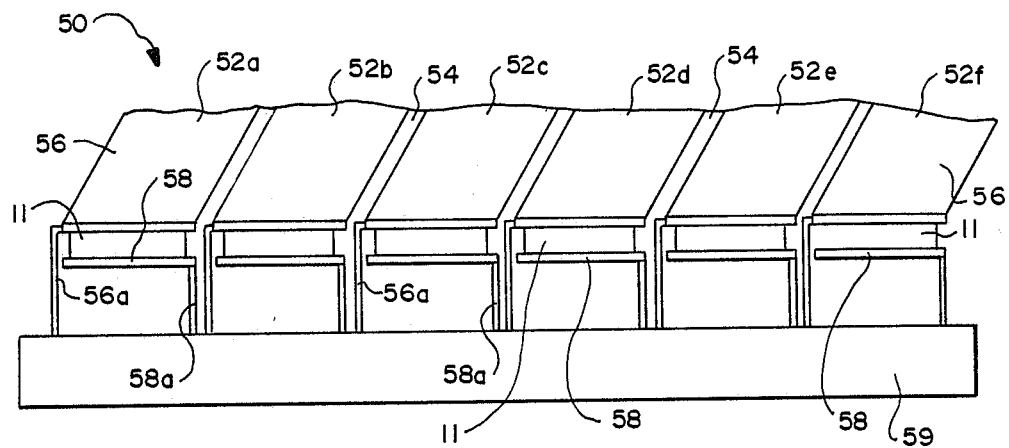
FIG. — 6

U.S. Patent  Feb. 21, 1989  Sheet 3 of 4  4,806,922
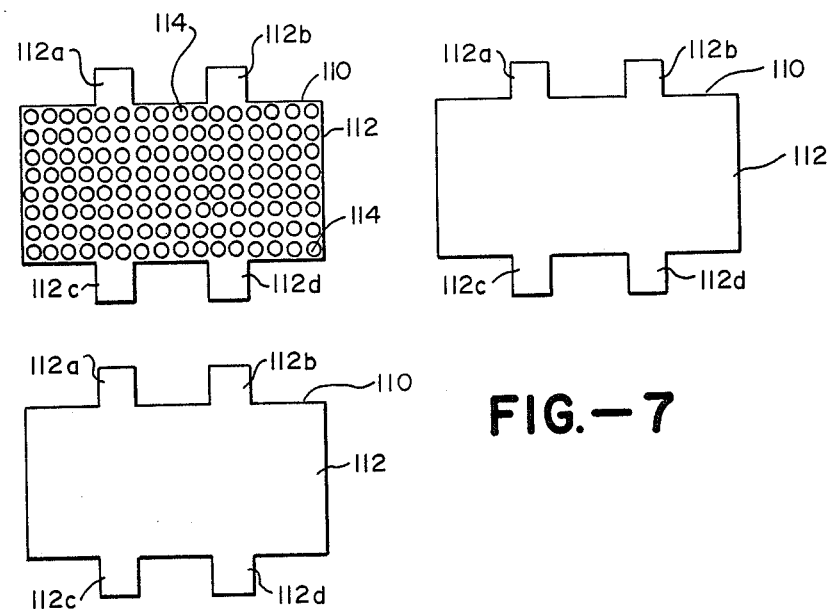
FIG.—7
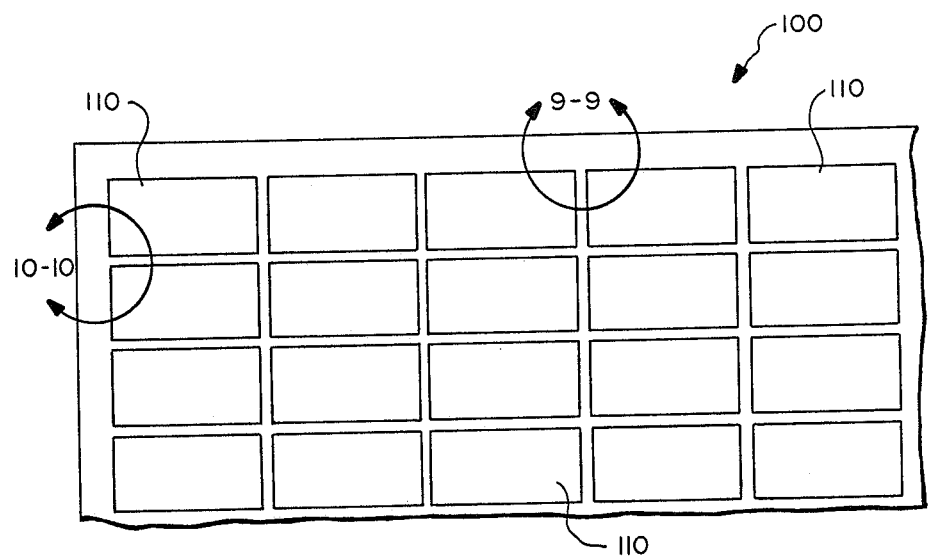
FIG.—8

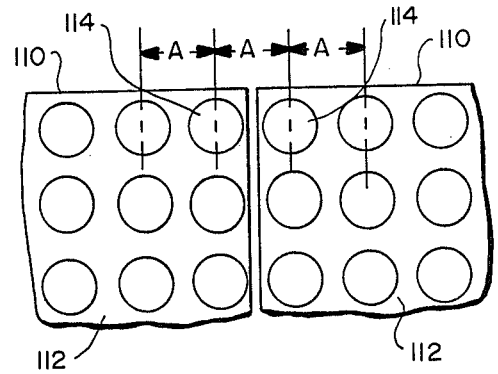
FIG.—9
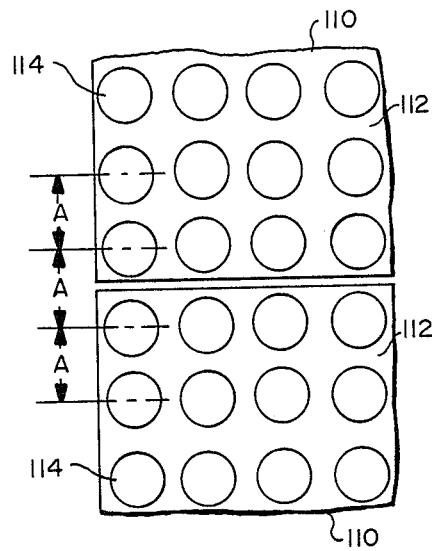
FIG.—10
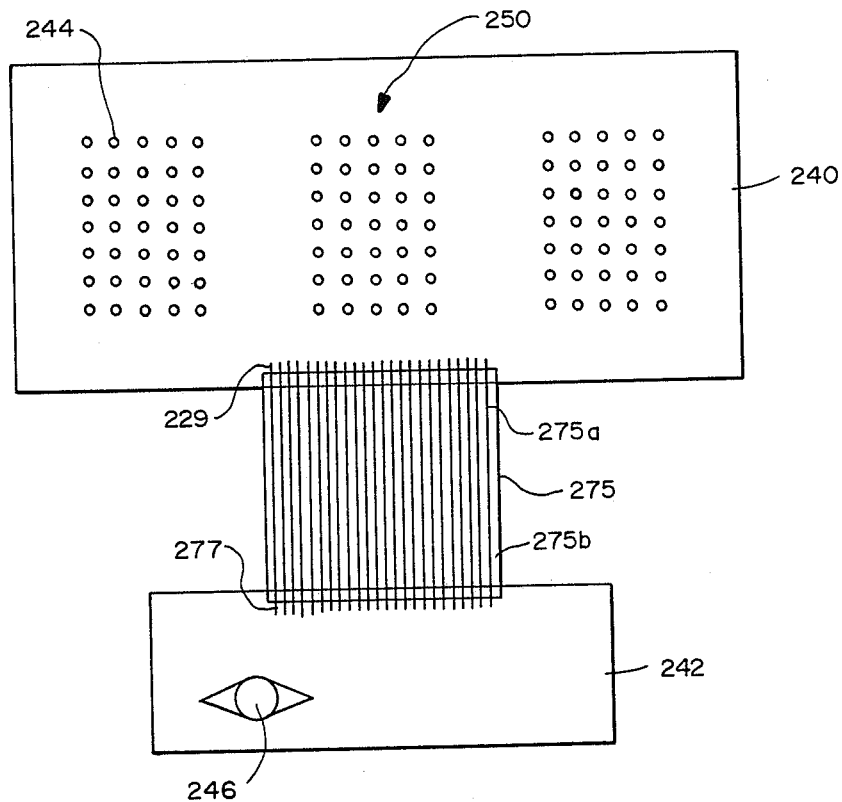
FIG.—11

DISPLAY DEVICE UTILIZING A PLURALITY OF NCAP LIQUID CRYSTAL MODULES

This is a continuation, of application Ser. No. 102,825 filed 9/23/87, now abandoned, which is a continuation of application Ser. No. 620,376 filed 6/12/84, now abandoned.

The present invention relates generally to liquid crystal, and more particularly to a visual display device utilizing a plurality of nematic curvilinearly aligned phases ("NCAP") liquid crystal modules.

Liquid crystals are used in a wide variety of devices, including visual display devices. The property of liquid crystals that enables them to be used, for example, in visual displays, is the ability of liquid crystals to transmit light on one hand, and to scatter light and/or to absorb it (especially when combined with an appropriate dye), on the other, depending on whether the liquid crystals are in a relatively free, that is de-energized or field-off state, or in a strictly aligned, that is energized or field-on state. An electric field selectively applied across the liquid crystals can be used to switch between field-off and field-on states.

In the past, devices using liquid crystals (not NCAP liquid crystals), such as visual display devices or other devices, have been of relatively small size. Large size devices using liquid crystals, such as, for example, a billboard display or a sign have not been able to be made satisfactorily for a number of reasons.

One reason is the fluidity of the liquid crystals, that is, the tendency of the liquid crystal material to flow to create areas of the display that have different thicknesses. Such thickness variations cause undesirable variations or gradations in the optical and electrical properties of the liquid crystal device.

The problem of maintaining a parallel relationship between the glass plates or substrates of a liquid crystal display device has also contributed to the difficulty of constructing a suitable large-size display. A lack of parallelism between the glass plates between which the liquid crystal material is located causes the device to have non-uniform optical and electrical characteristics, which are detrimental to its performance.

In view of the foregoing, an object of the present invention is to provide a liquid crystal display device having a large viewing or display area as well as a relatively high quality of operation, satisfactory contrast, and controlled uniformity of output.

Another object of the present invention is to provide a liquid crystal display device having a relatively large area, and which permits efficient and high quality functioning of a liquid crystal material in response to excitation or non-excitation by an external source.

Yet another object of the present invention is to provide a display device comprising a plurality of NCAP liquid crystal modules that effect a homogeneous display.

A further object of the present invention is to facilitate the interconnection of the electrodes of a NCAP liquid crystal apparatus to a circuit means for energizing the apparatus.

As may be seen hereinafter, the NCAP liquid crystal apparatus and display device disclosed herein is one which includes NCAP liquid crystal. NCAP liquid crystal comprises a liquid crystal material and containment means for inducing a generally non-parallel alignment of the liquid crystal material which in response to such alignment at least one of scatters and absorbs light and which in response to a prescribed input reduces the amount of such scattering or absorption.

The prescribed input is preferably of the electromagnetic type and, more particularly, an electric field. A pair of electrodes may be provided to apply the electric field. The electrodes may be located on opposite sides of the combination of the liquid crystal material and the containment means.

The display device of the present invention comprises a plurality of NCAP liquid crystal modules or apparatus. The NCAP liquid crystal modules are located adjacent to one another to effect a homogeneous display. As the display device comprises a plurality of discrete NCAP liquid crystal modules, it may be thought of as utilizing a segmented display.

The NCAP liquid crystal apparatus further includes flexible substrates on which the electrodes are formed. The substrates include flexible extensions or arms thereof. Conductive paths are formed on the substrates and their extensions. The substrate extensions are sufficiently flexible to facilitate and permit the interconnection of the electrodes via the conductive paths to suitable circuit means for applying an electric field across the electrodes.

The NCAP liquid crystal apparatus and display device of the present invention will be described in more detail hereinafter in conjunction with the drawings wherein:

FIG. 1 is a schematic view illustrating a NCAP liquid crystal apparatus in accordance with the present invention;

FIG. 2 is an enlarged, schematic view of the NCAP liquid crystal apparatus of FIG. 1 along line 2—2 thereof;

FIG. 3 is a schematic view illustrating a technique for manufacturing a NCAP liquid crystal apparatus in accordance with the present invention;

FIG. 4 is a schematic view illustrating a substrate of a NCAP liquid crystal apparatus made in accordance with the technique depicted in FIG. 3;

FIG. 5 is a schematic view which shows a NCAP liquid crystal display device utilizing a segmented display in accordance with the present invention;

FIG. 6 is a view of the NCAP liquid crystal display device of FIG. 5 along line 6—6 thereof;

FIG. 7 is a schematic view illustrating a number of NCAP liquid crystal apparatus modules which may be used to form a segmented display;

FIG. 8 is a schematic view which shows a NCAP liquid crystal display device utilizing a mosaic of NCAP liquid crystal apparatus modules to form a segmented display;

FIG. 9 is a view along line 9—9 of FIG. 8;

FIG. 10 is a view along line 10—10 of FIG. 8; and

FIG. 11 is a schematic view of an alternate embodiment of the present invention.

The present invention relates in the preferred embodiment described hereinafter to the use of liquid crystal material which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. patent application No. 477,242, filed Mar. 21, 1983, in the name of Fergason, entitled ENCAPSULATED LIQUID CRYSTAL AND METHOD, assigned to Manchester R&D Partnership now issued as U.S. Pat. No. 4,616,903, the disclosure of which is hereby incorporated by reference. Reference may also be made to co-pending U.S. Pat. No. 4,435,047, issued Mar. 6, 1984, in the name of Fergason, entitled ENCAPSULATED LIQUID CRYSTAL AND METHOD, assigned to Manchester R&D Partnership, and which disclosure is also hereby incorporated by reference.

It is to be understood, however, that the various principles of the present invention may be employed with any of the various types of liquid crystal materials (cholesteric, nematic or smectic) or combinations thereof, including combinations with dyes. Designation of the apparatus of the present invention as a NCAP liquid crystal apparatus or NCAP display device or any reference to NCAP liquid crystal is in no way intended to limit such apparatus or device to use with nematic liquid crystal materials. It is only for the sake of convenience and in an effort to use an abbreviated term that describes the apparatus of the present invention that it is referred to as a NCAP liquid crystal apparatus or display device Particularly, the term NCAP is used because the preferred liquid crystal material is nematic or operationally nematic liquid crystal and because in the field-off condition, or any other condition which results in the liquid crystal being in a distorted or randomly aligned state, the liquid crystal structure is distorted to a curved form (hence curvilinearly aligned) wherein the spatial average orientation of the liquid crystal material over a capsule-like volume, for instance, is strongly curved and there is no substantial parallel directional orientation of the liquid crystal in the absence of a prescribed input, for example, an electric field.

NCAP liquid crystals and a method of making the same and devices using NCAP liquid crystals are described in detail in the above-identified U.S. Pat. No. 4,435,047. Briefly, NCAP liquid crystal comprises a liquid crystal material that is dispersed in an encapsulating medium. A NCAP liquid crystal apparatus is an apparatus formed of NCAP liquid crystals that are capable of providing a function of the type typically inuring to a liquid crystal material For example, such a NCAP liquid crystal apparatus may be a visual display device that responds to the application and removal of an electric field to effect a selected attenuation of visible light.

Referring now to the drawings, attention is first directed to FIGS. 1 and 2. FIGS. 1 and 2 show a NCAP liquid crystal apparatus indicated generally by reference numeral 10. The apparatus includes a layer or layers of NCAP liquid crystal 11 supported on a substrate 12 having an electrode 13 located thereon. The apparatus further includes a second electrode 14 mounted on a second substrate 18. In the embodiment illustrated, electrode 14 comprises seven electrically isolated segments 14a-14g to form a seven segment figure-eight pattern or arrangement 30 wherein each segment may be selectively energized to create various numerical characters.

The NCAP liquid crystal 11 may include a liquid crystal material 20 more or less contained within the confines or the interior volume 21 of a capsule 22. The NCAP liquid crystal material comprises a plurality of such capsules or an encapsulating medium in which liquid crystal material is dispersed.

A quantity of liquid crystal material is confined or contained in volumes within the encapsulating medium, for example in a solid medium as individual capsules or dried stable emulsions. Such volumes may be discrete volumes, that is once formed, they ordinarily remain as individually distinct entities or separate entities. Such separate entities or discrete volumes, however, may also be interconnected, for example, by one or more passages. The liquid crystal material would preferably be in both the discrete volumes and in such interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

A voltage may be applied to electrodes 13 and 14, and hence across liquid crystal 11 from an AC or DC voltage source 16. Voltage source 16 is connected to electrode 13 by means of an electrical lead 15 and an electrically-conductive path 31 formed on substrate 12 and a flexible arm or extension 12a thereof Voltage 16 is connected to segments 14a-14g by means of electrically-conductive paths 29a-29g, respectively, formed on substrate 18 and flexible arm or extension 18a thereof. Each conductive path is in turn interconnected to respective electrical leads 19a-19g, which are connected to voltage source 16 through selectively closeable switches 17a-17g, respectively. (Note the fold in substrates 12 and 18, which may be flexible as hereinafter discussed, and in arms 12a and 18a to facilitate interconnection of electrodes 13 and 14a-14g to voltage source 16.)

When a selected switch is closed, apparatus 10 is in an energized or field-on state with the molecules of the liquid crystal material located between the energized electrodes in the desired alignment to permit the transmission of light. For example, closing switches 17f and 17g will energize segment 14f and 14g, that is, a voltage will be applied across electrodes 13 and 14f and 14g, and hence across the NCAP liquid crystal material located therebetween to display the numeral "1". When all switches are open, apparatus 10 is in a de-energized or field-off state such that the liquid crystal material scatters and/or absorbs light. The NCAP liquid material functions in this manner to attenuate or not to attenuate light incident thereon depending upon whether an electric field is applied thereacross.

Mounting substrates 12 and 18, and electrodes 13 and 14 may be optically transmissive so that NCAP liquid crystal apparatus 10 is capable of controlling the transmission of light therethrough in response to an electric field applied across the electrodes. Alternatively, electrode 14 and/or substrate 18 may be optically reflective or may have thereon an optically reflective coating so that reflection by such reflective coating of incident light will be a function of whether there is an electric field applied across the liquid crystal 11.

A plurality of NCAP liquid crystals 11 may be applied to substrate 12 in a manner such that they adhere to electrode 13 and substrate 12. The material of which capsules 22 is formed is suitable for binding or otherwise adhering the capsule to the electrode and/or substrate. In one embodiment, capsules 22 are formed of a polyvinyl alcohol (PVA). In the preferred embodiment, liquid crystal material is dispersed or entrapped in a latex medium. In either embodiment, substrate 12 and extension 12a thereof may be formed of a flexible, polyester film, such as Mylar®, that has been precoated with a 90 to 5000 ohms per square, and preferably 450±150 ohms per square, layer of indium tin oxide (ITO). The electrode coated surface of polyester substrate 12 is etched, as is well known in the art, to form electrode 13. Electrode 13 preferably has a rectangular shape that approximates the outline of figure-eight pattern 30. Conductive path 31 is also formed on substrate 12 and extension 12a by etching the electrode coated surface thereof to form the electrode trace 31 interconnecting electrode 13 to electrical lead 15.

The ITO coating forming electrode 13 and conductive path 31 is substantially optically transparent to electromagnetic radiation in at least a portion of the visible range. Such transparency is only achieved by increasing the resistivity of the ITO coating forming the electrode and conductive paths. A Mylar® film with a precoated ITO electrode, known as Intrex, may be purchased from Sierracin of Sylmar, Calif. Of course, materials other than ITO may be used to form the electrodes and conductive paths of the apparatus of the present invention.

As noted, latex entrapped NCAP liquid crystal is used in the preferred embodiment. Latex entrapped NCAP liquid crystal comprises the entrapment of liquid crystal in a latex medium. The latex is a suspension of particles. The particles may be natural rubber or synthetic polymers or copolymers. A latex medium is formed by drying a suspension of such particles. A further explanation of latex entrapped NCAP liquid crystal and methods of making the same are provided in U.S. Pat. No. 591,433, filed Mar. 20, 1984, now abandoned in the name of Pearlman, entitled LATEX ENTRAPPED NCAP LIQUID CRYSTAL COMPOSITION, METHOD AND APPARATUS, assigned to the assignee of the present invention, and which disclosure is hereby incorporated by reference.

Briefly, latex entrapped NCAP liquid crystal may be formed by mixing a suspension of latex particles and liquid crystal material wherein the liquid crystal material has been previously emulsified in an aqueous phase. Alternatively, all components may be combined prior to emulsifying the liquid crystal material. The mixture may then be applied to substrate 12 and electrode 13. As the mixture dries, it adheres to the electrode coated side of the polyester film. When dried, the latex particles form a latex medium with particles of liquid crystal dispersed therein.

A specific method for making latex entrapped NCAP liquid crystal may comprise first emulsifying 36 grams of the liquid crystal ROTN701 (manufactured by Hoffman La Roche of New York, N.Y.) in a solution containing 14 grams of a 12% aqueous solution of PVA and 1 gram of the surfactant TWEEN 20 (available through ICI Americas Incorporated of Wilmington, Del.) The liquid crystal is added continuously while the solution is mixed with an impeller blade at 3500 RPM. When the particle size of the liquid crystal is about 1-5 microns, 49 grams of Neorez R-967 (manufactured by Polyvinyl Chemical Industries, Wilmington, Mass.), containing 40% latex particles by weight, is added with slow mixing of less than 1000 RPM until the mixture is homogeneous. This material may then be cast with a doctor blade or other suitable means onto substrate 12 and electrode 13.

After the NCAP liquid crystal material has dried on electrode 13 and substrate 12, substrate 18 and electrode 14 formed thereon may be laminated onto the surface of the latex entrapped NCAP liquid crystal. Substrate 18 and its extension 18a may also be a flexible, Mylar® film precoated with a 90 to 5000 ohms per square, and preferably a 450±150 ohms per square, layer of ITO. The electrode segments 14a-14g are formed by etching the electrode coated surface of film 18 to delineate the prescribed pattern. Various other patterns, of course, could be formed.

Conductive paths 29a-29g are also formed on the surface of substrate 18 and extension or arm 18a by etching the ITO coated surface thereof to define these conductive paths that interconnect the electrode segments to the circuit means for applying an electric field. As discussed, the ITO coating forming electrode segments 14a-14g and conductive paths 29a-29g is substantially optically transparent. As such, the coating has a high resistance. It should be understood that the circuit means may comprise the electrical leads and voltage source shown in FIG. 1 or any other means for energizing the electrodes, such as a printed circuit board including appropriate driver electronics (see FIG. 6).

Flexible arm 18a on which a portion of conductive paths 29a-29g are formed (as well as arm 12a on which a portion of trace 31 is formed) is sufficiently flexible to permit interconnection of the conductive paths to a circuit means for energizing the electrodes. As shown in FIG. 2 (see also FIGS. 3, 4 and 6), arm 18a may be folded or bent to essentially act as an interconnect cable. Such an arrangement offers the distinct advantage of eliminating the need for a separate interconnect means, such as an elastomeric connector, for connecting the electrodes of a liquid crystal apparatus to the circuit used to drive the apparatus. In accordance with the present invention, such interconnect means is integrated into the respective substrates of NCAP liquid crystal apparatus 10.

The high resistance electrode traces or conductive paths 29a-29g may be overprinted with a low resistance conductive ink, such as Acheson Electrodag 427SS manufactured by Acheson Colloids of Port Huron, Mich., at the point where the respective electrical leads 19a-19g are connected to the conductive paths. The conductive ink is applied to the conductive paths outside of the viewing area of apparatus 10 so as not to interfere with the display. The use of conductive ink in this manner decreases the voltage drop along the conductive paths, especially at the point of interconnection with the electrical leads.

The conductive paths 29a-29g are adapted to be compatible with existing electrical connectors to facilitate connection of appropriate circuit means to the conductive paths for applying an electrical field across the electrodes of the apparatus. For instance, electrical connectors such as those manufactured by Berg Electronics of Willimington, Del., Part No. Series 65801 and staple style crimp connectors could be used to interconnect the conductive paths to the electrical leads.

FIG. 3 illustrates a technique for producing NCAP liquid crystal apparatus in accordance with the present invention. As shown, a sheet 38 of an electrode-coated flexible film, such as Intrex, has formed therein, as by stamping, a plurality flexible substrates 40 including flexible arms or extensions 40a thereof. In the embodiment illustrated, four figure-eight patterns 30 are formed on each substrate 40. As discussed, each figure-eight pattern is ordinarily divided into seven electrically isolated conductive segments, each of which may be selectively energized. Each segment of each pattern is to be connected to an appropriate driver circuit such as might be mounted on a printed circuit board (PCB) 42 (See FIG. 4) for driving the NCAP liquid crystal apparatus.

As shown in FIG. 4, transparent conductive paths or electrode traces, indicated generally by reference numeral 44, are provided for interconnecting the individual electrode segments of the various figure-eight patterns to an appropriate circuit for energizing the segments. The conductive paths are formed on the surface of flexible substrates 40 and flexible extensions 40a thereof. The conductive paths are thus formed in the same plane as the segmented electrodes, and preferably they are formed by etching the electrode coated surface of the substrate and its extension. Extensions or arms 40a are sufficiently flexible or foldable such that arms 40a in effect act as a flexible flat cable that permits the conductive paths formed thereon to be directly interconnected to a circuit means on PCB 42 for applying an electric field across the electrodes of the NCAP liquid crystal apparatus. As discussed heretofore, the conductive paths on arms 40a are adapted to be compatible with existing electrical connector means for proper connection to the PCB.

Although not illustrated, it would be understood that the other substrate of the NCAP liquid crystal apparatus on which typically a single electrode is mounted would be formed in the same manner. That is, the substrate and its extension or arm thereof would be die cut from a sheet of etched Intrex material, and the electrode and conductive path thereto would be formed on the electrode coated surface thereof.

FIGS. 5 and 6 illustrate a NCAP liquid crystal display device utilizing display segmentation The particular display 50 illustrated comprises a plurality of NCAP liquid crystal apparatus 52a–52f similar to the type heretofore described. However, rather than a figure-eight display, each NCAP liquid crystal apparatus is configured to comprise a dot matrix display. Of course, each NCAP liquid crystal apparatus could be adapted to display a figure-eight pattern or any other preestablished pattern. In the embodiment illustrated, 6×8 dot matrices may be used for each character, and there are a plurality of character positions for each NCAP apparatus 52a–52c. For instance, each NCAP apparatus 52a–52c could display 20 characters. The respective NCAP apparatus may be driven so that continuous information in a line format is displayed across the display area of display device 50, as illustrated by the visual output depicted in the upper half of device 50 (NCAP apparatus 52a–52c). Alternatively, adjacent NCAP apparatus may be driven and appropriate matrices or patterns formed so that their respective display areas are combined to effect a visual output that is additive of two or more individual displays, for example, as shown in the lower third (NCAP apparatus 52e–52f) of display device 50.

As illustrated, the displays are positioned adjacent to one another and the distance therebetween, represented by reference numeral 54, is minimized. The minimization of this distance 54 is achieved because each NCAP apparatus includes flexible extensions 56a and 58a, discussed in more detail below, which allow adjacent apparatus to be positioned very close to one another. The particular display illustrated comprises six NCAP liquid crystal apparatus 52a–52f each of which are 1 foot high by 20 feet long and arranged to form a relatively large display, such as a billboard or the scoreboard illustrated, that is 6 feet high by 20 feet long. It is to be understood, however, that in accordance with the present invention larger or smaller displays could be constructed.

As shown in FIG. 6, each NCAP apparatus comprises substrates 56 and 58, as heretofore described, with a layer or layers of NCAP liquid crystal material 11 located therebetween. Each substrate further includes respective flexible extensions 56a and 58a with suitable conductive paths formed thereon. As discussed above, appropriate electrodes are formed on the substrates, and the flexible extensions 56a and 58a with the conductive paths formed thereon are used to connect the various electrodes to appropriate connections on a printed circuit board 59, which includes the driver circuit for driving the display These interconnections are made in the manner heretofore described. As shown, each flexible extension or arm 56a and 58a is bent at an angle of 90° to provide these interconnections. Of course, if the interconnections can still be made, arms 56a and 58a could be bent at an angle of less than 90°.

The connection between the conductive paths on extensions 56a and 58a, and the connectors or the PCB may be permanent or detachable. Connectors for making such connections are well known in the art and are thus not described in detail.

A display device 100 comprising a mosaic of NCAP liquid crystal apparatus modules is shown in FIGS. 7–10. FIG. 7 shows a number of NCAP liquid crystal apparatus modules 110 which are utilized to form display device 100. Each module 110 comprises substrates (only substrate 112 is illustrated) between which is located the NCAP liquid crystal material As discussed, each substrate has an appropriate electrode means located thereon. In the embodiment illustrated, the electrode means are configured so that 8×16 dot matrices are used for each character, and each module 110 displays a single character. The character-forming electrode segments or dots 114 may be disposed on either one or both of the substrates. If the dots are formed on only one substrate, then a common electrode is formed on the other substrate.

In the embodiment shown, dots 114 are formed only on substrate 112. The other substrate has a common electrode formed thereon Substrate 112 includes four flexible arms or extensions 112a, 112b, 112c, and 112d. Conductive paths are formed on these flexible extensions for interconnection of the dots to suitable driver electronics. The other substrate (not shown) of module 110 may also include a flexible arm for interconnection of the common electrode to the driver electronics. The flexible extensions facilitate the interconnection of the common electrodes and dots to the driver electronics, and, as discussed below, permit a mosaic of modules 110 to be arranged to form a segmented display device having a high quality of operation.

As shown in FIGS. 8–10, display device 100 comprises a mosaic of NCAP liquid crystal apparatus modules 110 located adjacent to one another in both the "x" and "y" directions to form the display area of device 100. A unique advantage of the present invention is that the center line spacing "A" between adjacent dots 114 (including the spacing between dots located on substrates of adjacent modules) can be maintained at a more or less uniform distance This feature of the present invention significantly enhances the quality of operation and thus the feasibility of using a segmented display, as it permits a plurality of modules to be adjoined to one another to give the appearance of a continuous and homogeneous display.

FIG. 9 illustrates that dots 114 formed on the same and adjacent modules 110 of the present invention have a center line spacing equal to "A" in the "x" direction. In liquid crystal display devices used heretofore, it has not been possible to locate two such apparatus adjacent to one another such that the center line spacing between dots or segments formed on adjacent apparatus is more or less the same as the spacing between dots formed on an individual apparatus. The reason that this could not be done is that prior art liquid crystal apparatus require edge seals, of the type to seal in a liquid, to be formed about the perimeter of the substrates thereof to prevent the escape of liquid crystal material from the apparatus. The existence of such edge seals means that the center line spacing between dots on adjacent apparatus would be significantly greater than the center line spacing between dots on the same apparatus. A display effected by such apparatus would be non-homogeneous, as there would be a lack of uniformity of the display with respect to information displayed on adjacent apparatus. This obviously reduces the effectiveness and quality of a display of such a device. In an attempt to overcome such problems, prior art liquid crystal display devices have utilized cross-polarizers to form a display comprising a plurality of such apparatus.

The present invention provides for confinement of discrete quantities of liquid crystal material, for example, in capsules which permits each individual capsule or capsule-like volume to in effect operate as an independent liquid crystal device. The liquid crystal material is thus confined in an encapsulating medium with the result that the liquid crystal material cannot escape from its encapsulating medium. The NCAP liquid crystal apparatus utilized in the present invention therefore does not require edge seals to be formed in the substrates, for example, thereof. Thus, as shown in FIG. 9, modules 110 may be located adjacent to one another with the center line spacing in the "x" direction of segments 114 formed on adjacent modules substantially equal to the center line spacing of segments 114 on the same module.

FIG. 10 illustrates that the dots 114 formed on the same and adjacent modules 110 of the present invention have a center line spacing equal to "A" in the "y" direction. As discussed, in prior art liquid crystal display devices such uniform spacing was not possible because of the edge seal requirement. Another problem which prevented the maintenance of such uniform spacing was the necessity of electrically connecting the dots to the driver electronics. In the present invention, this is not a problem as such electrical connections are formed on flexible arms 112a–112d, which may be bent or folded down and away from the display to permit interconnection to the driver electronics while minimizing the spacing between adjacent modules. Since the spacing between adjacent modules is thus minimized, the center line spacing between dots on adjacent modules may be maintained at substantially the same distance as that of dots on the same module.

The effect of all of this is to enable the construction of a display device comprising a plurality of individual modules that can be positioned adjacent to one another to provide a display which is continuous and which appears to comprise a single display apparatus. The display device of the present invention therefore presents a display which is homogeneous or uniform. A homogeneous display in accordance with the present invention is one that provides the above-discussed features without the application of polarized light.

A display 100 could be made utilizing a plurality of 8×6 dot matrix characters wherein the center line spacing in the "x" direction between dots 114 on the same module would be approximately 0.150 of an inch. The center line spacing in the "x" direction between dots on adjacent modules would also be approximately 0.150 of an inch plus or minus 15 per cent. Similarly, the center line spacing in the "y" direction between dots on the same module could be approximately 0.150 of an inch, and the "y" direction center line spacing between dots on adjacent modules would be approximately 0.150 of an inch plus or minus 15 per cent. Such a display device would have a high quality of operation and form an extremely effective display It should be understood, however, that spacing "A" need not be the same in both the "x" and "y" directions.

The modules 110 may be connected in circuit with the driver electronics such that the dots or pels 114 of the respective modules are modularly addressed. The modules of a particular display may each contain an identical number of pels. The modules may be controlled by a serial input. A computer, such as a microprocessor 246 (see FIG. 11), may be utilized to apply such an input.

A feature of the present invention is a versatile display device can be created to display virtually any desired display of almost any size as of only selective segments of the electrodes on a substrate of the NCAP apparatus of the present invention.

Another feature of the present invention is that the flexible extensions or arms of the NCAP apparatus permit the substrates of the apparatus to be remotely mounted from the driver electronics. This feature allows for enhanced backlighting and frontlighting schemes and facilitates heating (when required) of the NCAP liquid crystal material.

An alternative embodiment of the invention is shown in FIG. 11. In this the flexible extensions or arms heretofore replaced by a conductive tape. The embodiment of FIG. 11 includes transparent conductive paths or electrode traces, indicated generally by reference numeral 229, for electrically interconnecting the individual electrode segments or dots 244 of the various 5×7 dot matrices 250 formed on substrate 240. As illustrated, the respective conductive paths 229 extend to the edge substrate 240 where they are to be electrically connected to an electrically-conductive, flexible 275 such as Scothlink Connector Tape manufactured, by the Electro/IEP Division of the 3M Company, Inc. of St. Paul, Minn. This type of connector tape comprises a plurality of conductor stripes 275a formed on a film backing 275b. The connector tape further includes an adhesive material for affixing the conductor stripes 275a to respective conductive segments 229.

The opposite ends of the conductor stripes of tape 275 are to be electrically connected to appropriate circuit paths 277 on a PCB 242. The PCB includes the driver circuitry for driving the dot matrices of the display. The driver circuitry may include microprocessor 246 for controlling the operation of the display. The connector tape may also be utilized to electrically connect the electrode means on the other substrate (this substrate and its associated electrode are not shown) of the apparatus of FIG. 11 to the driver circuitry on PCB 242.

The conductor stripes 275a of tape 275 may be connected to the points of connection on substrate 240 and PCB 242 by means of heat bonding. Specifically, a compressive force and heat may be applied at these points of connection to bond the tape thereto.

Although certain specific embodiments of the invention have been described herein in detail, the invention is not to be limited only to such embodiments, but rather only by the appended claims.

What is claimed is:

1. A liquid crystal display comprising a plurality of liquid crystal modules comprising part of an overall larger display and each module including a display medium comprising the combination of a liquid crystal material and containment means for inducing a distorted alignment of said liquid crystal material which in response to such alignment at least one of which scatters and absorbs light and which in response to a prescribed input reduces the amount of such scattering or absorption wherein said display medium is adhered to a substrate having a substantially uninterrupted surface such that said display medium of one module is positionable in abutting relationship to said display medium of another module such that at least two of said modules are abutting one another to effect said overall larger display that appears to a viewer to be continuous and uninterrupted.

2. The liquid crystal display of claim 1 wherein said modules are identical.

3. The liquid crystal display of claim 2 wherein said modules are controlled by a serial input.

4. The liquid crystal display of claim 3 wherein said input is computer controlled.

5. The liquid crystal display of claim 1 wherein each of said modules include multiple conductive segments for applying an electric field as said prescribed input and said conductive segments are modularly addressed.

6. The liquid crystal display of claim 5 wherein said substrate support s said conductive segments and said substrate includes a flexible extension for interconnection of said conductive segments to a circuit means for energizing said conductive segments to apply said electric field.

7. The liquid crystal display of claim 5 further including a flexible electrically-conductive tape for connecting said conductive segments to a circuit means for energizing said conductive segments to apply said 8. The liquid crystal display of claim 1 further including electrode means supported on said substrate for applying an electric field as said prescribed input.

9. The liquid crystal display device of claim 8 wherein said substrate includes a flexible extension thereof for interconnection of said electrode means to a circuit means.

10. The liquid crystal display of claim 8 further including a flexible electrically-conductive tape for connecting said electrode means to a circuit means.

11. A liquid crystal display comprising:
a plurality of liquid crystal modules each including,
(i) a display medium comprising the combination of a liquid crystal material and containment means for inducing a distorted alignment of said liquid crystal material which in response to such alignment at least one scatters and absorbs light and which in response to an electric field reduces the amount of such scattering or absorption, said liquid crystal material and said containment means adhered to a substrate having a substantially uninterrupted surface, and
(ii) electrode means for applying said electric field; and
said display medium of one module positioned in abutting relationship with said display medium of another module such that at least two of said modules are abutting one another to effect an overall larger display that appears to a viewer to be continuous and uninterrupted.

12. The liquid crystal display of claim 11 wherein said substrate support s said electrode means and said substrate includes a flexible extension thereof having at least one conductive path formed thereon, said extension sufficiently flexible for interconnection of said conductive path to a circuit means for energizing said electrode means to apply said electric field.

13. The liquid crystal display device of claim 11 wherein at least one of said electrode means comprises a pattern of conductive segments with the center line spacing of each of said conductive segments throughout the liquid crystal display being substantially uniform in the "x" direction and substantially uniform in the "y" direction.

14. The liquid crystal display of claim 11 wherein:
said substrate has conductive paths formed thereon for connecting said electrode means to a circuit means for energizing said electrode means to apply said electric field; and
a conductive tape for electrically connecting said conductive paths to said circuit means.

15. A liquid crystal display device, comprising:
a plurality of liquid crystal apparatus each including,
(i) a display medium comprising the combination of a liquid crystal material and containment means for inducing a distorted alignment of said liquid crystal material which in response to such alignment at least one of scatters and absorbs light and which in response to an electric field reduces the amount of such scattering or absorption,
(ii) a first substrate for supporting the combination of said liquid crystal material and said containment means, said first substrate having a substantially uninterrupted surface,
(iii) a first electrode means on said first substrate for applying said electric field,
(iv) a second electrode means on a second substrate on the side of the combination of said liquid crystal material and said containment means remote from said first substrate,
(v) a conductive path on said first and second substrates for use in energizing said first and second electrode means, and
(vi) a part of each of said first and second substrates forming at least one flexible extension on which at least a portion of said conductive paths are formed, said extensions and said first and second substrates sufficiently flexible for interconnection of said electrode means via said conductive paths to a circuit means for energizing said electrode means to apply said electric field; and
a viewing area of said display device for effecting a visual output display wherein said display medium of one of said liquid crystal apparatus is positioned in abutting relationship with said display medium of another liquid crystal apparatus such that at least two of said liquid crystal apparatus are abutting one another to define said viewing area that appears to a viewer to be continuous and uninterrupted.

16. The liquid crystal display device of claim 15 wherein at least one of said first and second electrode means is formed to have a preestablished pattern of conductive segments forming a dot matrix.

17. The liquid crystal display device of claim 16 wherein the center line spacing of each conductive segment throughout said display device is substantially uniform in the "x" direction and substantially uniform in the "y" direction.

18. A liquid crystal apparatus, comprising:
a display medium comprising the combination of a liquid crystal material and containment means for inducing a distorted alignment of said liquid crystal material which in response to such alignment at least one of scatters and absorbs light and which in response to an electric field reduces the amount of such scattering or absorption;
electrode means for applying said electric field;
substrate means for supporting the combination of the liquid crystal material and the containment means and said electrode means, said substrate means having a substantially uninterrupted surface and a part of said substrate means forming a flexible extension;
at least one conductive path formed on said extension for energizing said electrode means; and
said extension sufficiently flexible to permit said conductive path formed thereon to be interconnected to a circuit means for energizing said electrode means to apply said electric field.

19. The liquid crystal apparatus of claim 18 wherein at least one of said electrode means is formed to have a preestablished pattern of conductive segments and said electrode means so formed is supported on said substrate means.

20. The liquid crystal apparatus of claim 19 wherein there are a plurality of conductive paths formed on said extension for interconnecting said conductive segments to said circuit means.

21. A liquid crystal apparatus, comprising:
a display means comprising the combination of a liquid crystal material and containment means for inducing a distorted alignment of said liquid crystal material which in response to such alignment at least one of scatters and absorbs light and which in response to an electric field reduces the amount of such scattering or absorption;
a first substrate for supporting the combination of said liquid crystal material and said containment means, said substrate having a substantially uninterrupted surface;
a first electrode means on said first substrate for applying said electric field;
a second electrode means on a second substrate on the side of the combination of said liquid crystal material and said containment means remote from said first substrate;
at least one of said substrates including a flexible extension thereof;
at least one conductive path for energizing said electrode means formed on said flexible extension; and
said flexible extension sufficiently flexible for direct interconnection of said conductive path formed thereon to a circuit means for energizing said electrode means to apply said electric field.

22. The liquid crystal apparatus of claim 21 wherein at least one of said electrode means is formed to have a preestablished pattern of conductive segments and said electrode means so formed is supported on said substrate including said flexible extension.

23. The liquid crystal apparatus of claim 22 wherein said substrate supporting the other of said electrode means also includes a flexible extension thereof wherein at least one conductive path is formed thereon for direct interconnection of said electrode means to said circuit means.

24. A liquid crystal display device, comprising a plurality of liquid crystal apparatus comprising part of an overall larger display and each including,
(i) a display medium comprising the combination of a liquid crystal material and containment means for inducing a distorted alignment of said liquid crystal material which in response to such alignment at least one of scatters and absorbs light and which in response to an electric field reduces the amount of such scattering or absorption,
(ii) a first substrate for supporting the combination of said liquid crystal material and said containment means, said first substrate having a substantially uninterrupted surface,
(iii) a first electrode means on said first substrate for applying said electric field,
(iv) a second electrode means on a second substrate on the side of the combination of said liquid crystal material and said containment means remote from said first substrate,
(v) conductive paths on said first and second substrates for energizing said first and second electrode means, and
(vi) a part of each of said first and second substrates forming at least one flexible extension on which at least a portion of said conductive paths are formed, said extensions sufficiently flexible for interconnection of said first and second electrode means and said conductive segments via said conductive paths to a circuit means for energizing said first and second electrode means to apply said electric field; and
a viewing area of said display device for effecting said overall larger display wherein said liquid crystal material and containment means of one of said liquid crystal apparatus is positioned in abutting relationship with said liquid crystal material and containment means of another liquid crystal apparatus such that at least two of said liquid crystal apparatus are abutting one another to define said overall larger display that appears to a viewer to be continuous and uninterrupted.

* * * * *